United States Patent
Klapperich

(10) Patent No.: US 6,283,683 B1
(45) Date of Patent: Sep. 4, 2001

(54) HINGE DRILLING JIG

(76) Inventor: Leo Klapperich, Im Kühstiefel 21, 56653 Wehr (DE)

( * ) Notice: Subject to any disclaimer, the term of this patent is extended or adjusted under 35 U.S.C. 154(b) by 0 days.

(21) Appl. No.: 09/465,955

(22) Filed: Dec. 17, 1999

(30) Foreign Application Priority Data

Dec. 19, 1998 (DE) .............................................. 198 58 910

(51) Int. Cl.$^7$ .................................................. B23B 49/00
(52) U.S. Cl. .................. 408/103; 408/115 R; 408/241 S
(58) Field of Search .......................... 408/97, 103, 115 R, 408/14, 202, 241 S

(56) References Cited

U.S. PATENT DOCUMENTS

| | | | |
|---|---|---|---|
| 569,896 | * 10/1896 | Cauwenberg | ......................... 408/202 |
| 2,308,055 | * 1/1943 | Cogsdill | ................................ 408/112 |
| 2,710,549 | * 6/1955 | Cogsdill | ................................ 408/202 |
| 5,222,845 | * 6/1993 | Goldstein et al. | ................... 408/103 |

FOREIGN PATENT DOCUMENTS

| | | | |
|---|---|---|---|
| 954576 | * 11/1956 | (DE) | ....................................... 408/97 |
| 2137262 | * 2/1973 | (DE) | ..................................... 408/103 |
| 2841200 | * 4/1979 | (DE) | ....................................... 408/97 |
| 2023034 | * 12/1979 | (GB) | ................................. 408/115 R |
| 2058613 | * 4/1981 | (GB) | ................................. 408/115 R |

* cited by examiner

*Primary Examiner*—Daniel W. Howell
(74) *Attorney, Agent, or Firm*—Friedrich Kueffner

(57) ABSTRACT

A device for positionally accurately guiding cup drills, particularly for producing blind-end holes for cup hinges in plate-shaped structural components composed of wood or a substitute wood material, is composed of a U-shaped base body which can be placed on the plate-shaped structural component. The base body has in one leg thereof a tightening screw and in the other leg a carriage with a guide opening for the cup drill, wherein the carriage is displaceable relative to the web and can be clamped against the plate-shaped component.

5 Claims, 1 Drawing Sheet

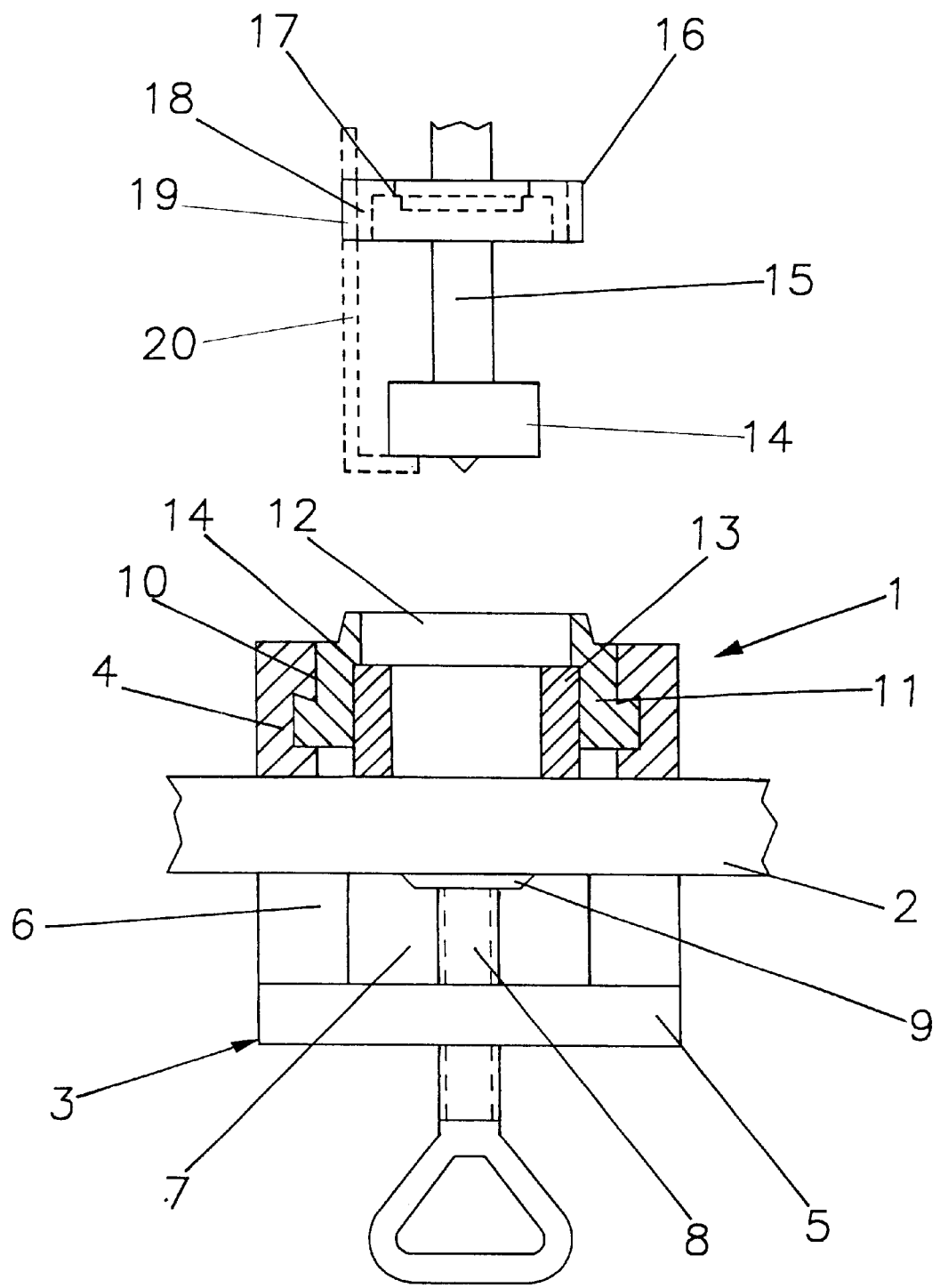

HINGE DRILLING JIG

BACKGROUND OF THE INVENTION

1. Field of the Invention

The present invention relates to a device for positionally accurately guiding cup drills, particularly for producing blind-end holes for cup hinges in plate-shaped structural components composed of wood or a substitute wood material.

2. Description of the Related Art

For fastening so-called cup hinges to pieces of furniture or similar objects, it is necessary to produce blind-end holes or blind-end bores in the plate-shaped structural components in the piece of furniture, for example, in a part of a closet or a door, wherein the cup components of the cup hinges are then fastened in the blind-end holes or bores. It is particularly important in this connection that the blind-end holes are located in a precisely predetermined position because deviations from the position impair the seat of the door. The door may also be a flap. Such blind-end holes are manufactured by means of so-called cup drills which are also called Forstner drills. Even if the position for a blind-end hole has been marked extremely precisely, it may happen that the cup drill runs of f center because the drill does not have a sufficient guide tip. The drill may also run off center especially when the plate-shaped component in which the blind-end hole is to be manufactured is of a relatively soft wood with different fiber structure. In addition, it must be taken into consideration that such blind-end holes are usually manufactured by a manual drilling machine in which the drill mounted in the drilling machine is never guided.

SUMMARY OF THE INVENTION

Therefore, it is the primary object of the present invention to provide a device for positionally accurately guiding cup drills for manufacturing blind-end holes for cup hinges which not only facilitates a very precise positioning of the blind-end hole, but also prevents the blind-end hole from being manufactured off center and non-circular. In addition, the device is to be constructed in such a way that the cup drill is movable only up to a predetermined depth, so that breakthroughs in the plate-shaped components are avoided. This may especially happen if the blind-end hole to be manufactured has a depth which is very close to the thickness of the structural component.

In accordance with the present invention, the device is composed of a U-shaped base body which can be placed on the plate-shaped structural component, wherein the base body has in one leg thereof a tightening screw and in the other leg a carriage with a guide opening for the cup drill, wherein the carriage is displaceable relative to the web and can be clamped against the plate-shaped component.

This device can be aligned very precisely on the plate-shaped component in which a blind-end hole is to be manufactured. For this purpose, the device is provided with scales and/or a system of coordinates. The cup drill is guided very precisely up to the drilling location. It is no longer possible that the drill runs off center. This is a particular advantage if the blind-end holes are to be manufactured by means of an unguided manual drilling machine. Moreover, the edge rim of the drilled blind-end hole can no longer tear because the contact pressure edge of the guide opening is located directly adjacent the drilling area. In addition, the device according to the present invention makes it also possible to manufacture blind-end holes which, for example, extend into each other and/or are at least partially located outside of the plate-shaped structural component.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a schematic illustration, partially in section, of an embodiment of the device according to the present invention.

DESCRIPTION OF THE PREFERRED EMBODIMENTS

The drawing shows a device 1 which is used for the positionally accurate manufacture of blind-end holes for so-called cup hinges in a plate-shaped structural component 2, for example, of wood, by means of an unguided manual drilling machine. This device 1 is composed of a base body 3, for example, of synthetic material, which has a U-shaped configuration and, in the illustrated embodiment, is pushed from the rear onto the plate-shaped structural component 2.

The U-shaped base body 3 has an upper leg 4 which rests on the upper side of the plate-shaped structural component 2, and a lower leg 5 which is connected through a web 6 to the upper leg 4. In the illustrated embodiment, the web 6 is provided with a recess 7. The lower leg 5 has a threaded bore, not shown in detail, wherein a screw 8 is screwed into the threaded bore. This screw 8 has at its inner end a clamping plate 9 which can be placed against the bottom side of the plate-shaped structural component 2.

The upper leg 4 of the U-shaped base body 3 has a laterally profiled recess 10 which extends perpendicularly of the plane of the drawing, wherein a carriage 11 is slidably guided in the recess 10 perpendicularly of the plane of the drawing. The carriage 11 has a stepped bore 12 into which a sleeve 13 is inserted from below. This sleeve 13 rests against a circumferential step 14 of the bore 12. In accordance with an advantageous feature, the carriage 11 may also be of synthetic material, while the sleeve 13 is manufactured of metal.

The length of the sleeve 13 is dimensioned in such a way that the lower end face thereof is located in a plane with the lower or inner surface of the leg 4. It is advantageous if the lower end face of the sleeve 13 protrudes slightly beyond the lower or inner end face of the leg 4. The outer diameter of the sleeve 13 is dimensioned in such a way that the sleeve 13 is received in the bore 12 or the carriage 11 in a clamping manner.

However, it is advantageous if at least one spring-biased ball is radially guided in the carriage 11 or in the sleeve 13, wherein the ball protrudes either beyond the outer circumferential surface of the sleeve 13 or beyond the inner circumferential surface of the bore 12. On the other hand, the inner circumferential surface of the bore 12 or the outer circumferential surface of the sleeve 13 has a segment-like recess into which the spring-biased ball can engage. This also constitutes a means for securing the sleeve 13 against rotation in the stepped bore 12. In the event that the carriage 11 is of synthetic material, the above-described ball can be replaced by a corresponding resilient projection at the inner circumferential surface of the bore 12.

The upper side of the leg 4 and the upper side of the carriage 11 may be provided with scales or a system of coordinates to be used for very precisely aligning the device 1 relative to the blind-end bore or blind-end hole to be manufactured. For easily sliding the carriage 11 into the leg 4, the carriage 11 may be provided at its upper side, for example, with a finger recess.

The sleeve 13 is exchangeably received in the carriage 11. The inner diameter of the sleeve 13 corresponds to the outer diameter of a cup drill 14 shown above the device 1. When a cup bore or a blind-end hole is to be manufactured in the plate-shaped component 2, the sleeve 13 ensures that the bore is produced very accurately at the predetermined location and that the cup drill 14 is safely prevented from running off center. Moreover, the edge of the hole in the plate-shaped structural component 2 is also prevented from tearing because the bottom side of the sleeve 13 rests tightly against the surface of the plate-shaped structural component 2. This is particularly ensured if, as already mentioned, the sleeve 13 protrudes slightly beyond the bottom side of the carriage 11. For example, if a cup drill 14 with a larger diameter is used, it is merely necessary to remove the sleeve 13 and to replace it with another sleeve 13 with a larger inner diameter which corresponds to the outer diameter of the new cup drill 14.

In the illustrated embodiment, a so-called depth stop 16 is provided at the shaft 15 of the cup drill 14, wherein the depth stop 16 is composed of a sleeve 17 attached to the shaft 15 and a ring 18 which is rotatably mounted on the sleeve 17. The ring 18 additionally has at its outer surface at least one groove 19 into which a ruler, only indicated schematically, can be inserted. This makes it possible to precisely adjust the depth stop 16 and to prevent the blind-end hole or cup bore from being made deeper than required. However, this also ensures that breakthroughs are prevented when manufacturing blind-end holes or cup holes. The rotatable depth stop 16 is of particular advantage if the blind-end hole to be manufactured is supposed to have a very great depth which makes it necessary to initially remove the device 1. Further drilling is then carried out without the device 1. The rotatable configuration of the depth stop 16 eliminates any damage to the surface of the plate-shaped structural component 2. When blind-end holes with only a small depth are to be drilled, the depth stop 16 may be bell-shaped so as to partially engage over the cup of the drill 14.

The carriage 11 can also be used without the base body 3 for drilling blind-end holes in a plate-shaped structural component 2. In that case, the carriage 11 may be clamped against the plate-shaped structural component 2, for example, by means of a screw clamp. However, an exact alignment is not possible in this case.

While specific embodiments of the invention have been shown and described in detail to illustrate the inventive principles, it will be understood that the invention may be embodied otherwise without departing from such principles.

I claim:

1. A device for positionally accurately guiding cup drills for manufacturing blind-end holes for cup hinges in plate-shaped structural components composed of wood or substitute wood materials, the device comprising a U-shaped base body adapted to be placed on the plate-shaped structural component, wherein the base body has first and second legs and a web connecting the first and second legs, a tightening screw being mounted in the first leg, wherein a carriage adapted to be clamped against the plate-shaped component is slidably mounted in the second leg so as to be displaceable perpendicularly of the web, wherein the carriage has a guide opening for the cup drill, wherein a sleeve is mounted in the carriage and the guide opening is formed in the sleeve, and wherein the sleeve protrudes slightly beyond a bottom side of the carriage.

2. The device according to claim 1, wherein the sleeve is exchangeably mounted in the carriage.

3. The device according to claim 1, wherein the cup drill comprises an annular depth stop rotatably secured to the cup drill.

4. The device according to claim 3, wherein the depth stop has at an outer surface thereof at least one groove for receiving a ruler.

5. The device according to claim 3, wherein the rotatable depth stop has a bell-shaped cross-section.

* * * * *